United States Patent Office 3,775,426
Patented Nov. 27, 1973

3,775,426
(BENZIMIDAZOL - 2 - YLTHIO)-BENZOYL-ALKYL CARBOXYLIC ACIDS AND THEIR ALKYL ESTERS
Peter H. L. Wei, Springfield, and Stanley C. Bell, Penn Valley, Pa., assignors to American Home Products Corporation, New York, N.Y.
No Drawing. Original application Mar. 17, 1971, Ser. No. 125,378, now Patent No. 3,704,239. Divided and this application July 20, 1972, Ser. No. 273,570
Int. Cl. C07d 49/38
U.S. Cl. 260—309.2                                                 6 Claims

ABSTRACT OF THE DISCLOSURE

Novel compounds of Formula I and Formula II have been prepared which have CNS depressant and antitubercular activity:

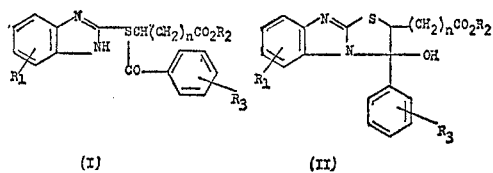

(I)                     (II)

wherein $R_1$ is selected from the group consisting of hydrogen, halogen, (lower)alkyl, trifluoromethyl, nitro and amino;
$R_2$ is selected from the group consisting of hydrogen and (lower)alkyl;
$R_3$ is selected from the group consisting of hydrogen, halogen, (lower)alkyl, trifluoromethyl, nitro, amino, phenyl, halophenyl and (lower)alkylphenyl;
$n$ is an integer of from 1 to about 3; and the pharmaceutically acceptable acid addition salts thereof.

This is a division, of application Ser. No. 125,378, filed Mar. 17, 1971, now U.S. 3,704,239.

DESCRIPTION OF THE INVENTION

This invention is directed to the preparation of new and novel pharmacologically active compounds. The compounds of the invention are those of Formulas I and II.

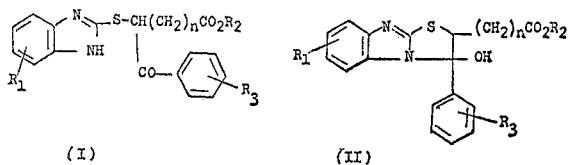

(I)                     (II)

wherein $R_1$ is selected from the group consisting of hydrogen, halogen, (lower)alkyl, trifluoromethyl, nitro and amino;
$R_2$ is selected from the group consisting of hydrogen, and (lower)alkyl;
$R_3$ is selected from the group consisting of hydrogen, halogen, (lower)alkyl, trifluoromethyl, nitro, amino phenyl, halophenyl and (lower)alkylphenyl;
$n$ is an integer of from 1 to about 3; and the pharmaceutically acceptable acid addition salts thereof.

The following reaction scheme illustrates the process of preparing the compounds of the invention when $R_2$ is lower alkyl:

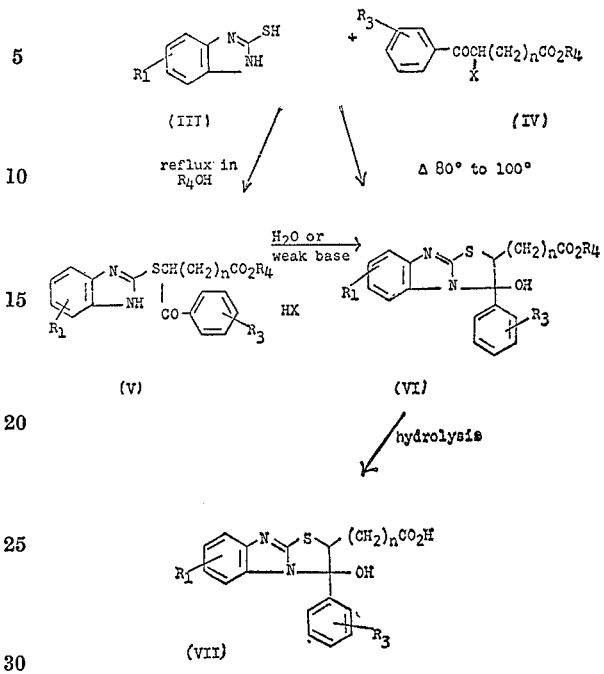

wherein $R_1$, $R_3$ and $n$ are the same as hereinabove described; $R_4$ is (lower)alkyl and X is halogen.

In the above described procedure when the compounds are directly cyclized, glacial acetic acid, dimethoxy ethane or a corresponding alcohol may be employed as a solvent. It is preferred to heat the reactants at a temperature of from 80° to 100° for a period of from about three to about fifteen hours. The crude product may then be recrystallized from a suitable solvent such as acetone or acetonitrile. When the compounds of Formulas III and IV are admixed, it is preferred to employ an alcohol wherein $R_4$ of Formula IV is the same as $R_4$ of the alcohol as the solvent. The reacants are then refluxed for a period of about five to fifteen hours. The product may be separated by conventional techniques purified by recrystallization. Compounds of Formula VI may be hydrolyzed to compounds of Formula VII by conventional techniques. The term weak base as employed herein is meant to include sodium bicarbonate, sodium carbonate, potassium carbonate, pyridine, triethylamine and the like.

Compounds wherein $R_2$ is hydrogen may also be prepared as follows:

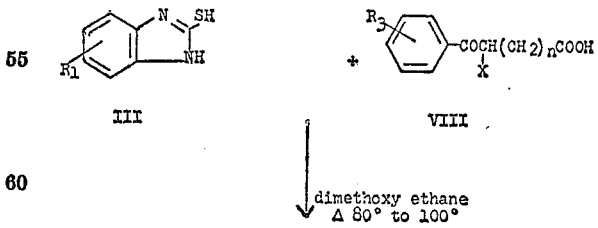

III                    VIII

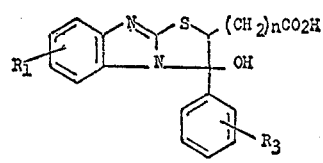

VII wherein $R_1$, $R_3$ and X are the same as hereinabove described.

In the above-described reaction scheme, it is preferred to heat the compounds of Formulas III and VIII for a period of from about five to about fifteen hours. The crude hydrohalide salts of Formula VII may then be purified by recrystallization from a suitable solvent. The cyclization of Formula V to Formula VI may be accomplished by the addition of water or a weak base.

The compounds of Formula I and Formula II were $R_2$ is lower alkyl, while not being limited thereto, are useful for the in vitro inhibition of *M. tuberculosis*. The compounds thus may be employed for example in hospitals, sanitariums and the like to effectively inhibit the causative organisms of tuberculosis by contacting infected areas and materials with aqueous dispersions of said compounds. Where $R_2$ of the compounds of Formula I and Formula II is hydrogen, the compounds are central nervous system depressants. Compounds of the invention have been tested by determining the minimal inhibitory concentration which will completely inhibit *M. tuberculosis*, human type, strain H37Rv. The compounds of Formulas I and II, wherein $R_2$ is lower alkyl, have been found to be active when admixed with the test organism in an aqueous dispersion at a concentration of 50 $\mu$g./ml. Some compounds such as 3-(p-chlorophenyl) - 2,3 - dihydro - 3-hydroxythiazolo[3,2-a] benzimidazole-2-acetic acid, ethyl ester, have been found to be effective at a concentration of 0.5 $\mu$g./ml.

In the evaluation of the biological activity of the compounds of Formulas I and II wherein $R_2$ is hydrogen, the in vivo effects were tested as follows: The compound was administered orally or intraperitoneally to three mice (14 to 24 grams) at each of the following doses: 400, 127, 40 and 12.7 milligrams per kilogram of host body weight (mpk.). The animals were watched for a minimum of two hours during which time signs of general stimulation, (i.e., increased spontaneous motor activity, hyperactivity on tactile stimulation; twitching), general depression (i.e., decreased spontaneous motor activity, decreased respiration), autonomic activity (i.e., miosis, mydriosis, diarrhea) were noted.

The compounds of this invention induce central nervous system depressant effects at a dose of 40 to 400 mpk. intraperitoneally. Thus the compounds of Formulas I and II wherein $R_2$ is hydrogen, have demonstrated utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a calming effect in mammals.

The nomenclature employed to described certain substituted compounds of Formula I uses a parenthetical numbering system, e.g. 5(6) or 4(7), to identify the positioning of substituents on the benzimidazolyl moiety. The reason for this type of nomenclature is because it is not possible to fix the position of the substituent because of the proton shift due to the —NH—C=N— group. This is in accordance with the nomenclature for imidazole type compounds set forth in Heterocyclic Compounds, R. C. Elderfield, Editor, vol. 5, pp. 198, 199 and 238. To describe the compounds of Formula II when the benzimidazolyl moiety is substituted, the alternative nomenclature is employed. This is because when the compounds of Formula II are formed by ring closure the tautomerism of the NH—C=N— moiety does not permit any absolute prediction as to the positioning of the benzimidazolyl moiety.

EXAMPLE 1

3 - (benzimidazol - 2 - ylthio)-3-(p-chlorobenzoyl)propionic acid, ethyl ester, hydrobromide An alcoholic solution of ethyl ester 3-bromo-3-(p-chlorobenzoyl)propionic acid (16.0 g., 0.05 m.) and 2-mercaptobenzimidazole (7.5 g., 0.05 m.) was heated on a steam bath for 5 hours. After the solvent was removed the residue was dissolved in benzene. The solid was collected and weighed 21.8 g. The crude material was recrystallized from ethanol. The pure ethyl ester of 3-(benzimidazole-2-ylthio) - 3 - (p - chlorobenzoyl) - propionic acid hydrobromide had a melting point of 168–170° C.

*Analysis.*—Calcd. for $C_{19}H_{17}ClN_2O_3S \cdot HBr$ (percent): C, 48.57; H, 3.86; N, 5.98. Found (percent): C, 48.23; H, 4.09; N, 6.07. IR spectrum showed a twin carbonyl ester 5.75$\mu$ and keto 5.90$\mu$. The NMR spectrum showed aromatic protons at 7.8$\delta$ (m.); methane at 5.9$\delta$ (t.); acetyl methylene at 3.3$\delta$; ethoxy at 4.1 (q.) and 1.2$\delta$ (t.) and also exchangeable proton at 9.6$\delta$.

EXAMPLE 2

3 - (p - chlorophenyl - 2,3 - dihydro-3-hydroxythiazolo-[3,2-a]benzimidazole-2-acetic acid, ethyl ester The hydrobromide of the ethyl ester 3-(benzimidazole-2-ylthio)-3-(p-chlorobenzoyl)propionic acid, (21.8 g.) was first ground and then added to 500 ml. of water. The suspension was stirred at room temperature for five hours. The solid was collected and rinsed with water and sucked dry. Recrystallization of the crude material from acetone, gave 15 g. of pure ethyl ester of 3-(p-chlorophenyl)-2,3-dihydro - 3 - hydroxythiazole[3,2-a]benzimidazole acetic acid, M.P. 140–2° C.

*Analysis.*—Calcd. for $C_{19}H_{17}ClN_2O_3S$ (percent): C, 58.68; H, 4.41; N, 7.21. Found (percent): C, 58.70; H, 4.44; N, 7.07. IR spectrum showed the absence of amine salt absorption at 3.6$\mu$ and keto signal at 5.9$\mu$. The NMR spectrum: aromatic 7.5$\delta$(m.); methine 5.8$\delta$ (two sets of doublets); acetyl methylene 3.3$\delta$; ethoxy 4.1$\delta$ (q.) and 1.2$\delta$ (t.).

EXAMPLE 3

3 - (p - chlorophenyl - 2,3 - dihydro-3-hydroxythiazolo-[3,2-a]benzimidazole-2-acetic acid A dimethoxyethane solution of 2-mercaptobenzimid azole (10.0 g., 0.066 m.) and 3-bromo-3-(p-chlorobenzoyl)propionic acid (17.4 g., 0.06 m.) was heated for 3 hours. The solid that separated from the chilled solution was collected, washed with dimethoxyethane, and dried to give 25 g. of crude hydrobromide salt of 3-(p-chlorophenyl) - 2,3 - dihydro - 3 - hydroxythiazolo[3,2-a]benzimidazole-2-acetic acid, M.P. 203–205°. The IR spectrum of the hydrobromide of the thiazolobenzimidazole acetic acid showed only a single free carboxylic function at 6.0$\mu$.

The above hydrobromide salt (17 g.) dissociated in water to give the free acid, which was recrystallized from acetonitrile to give 12.0 g. of pure 3-(p-chlorophenyl)-2,3-dihydro-3-hydroxythiazolo[3,2-a]benzimidazole-2 - acetic acid, M.P. 160–3°.

*Analysis.*—Calcd. for $C_{17}H_{13}ClN_2O_3S$ (percent): C, 56.59; H, 3.63; N, 7.76; S, 8.89. Found (percent): C, 56.33; H, 3.58; N, 7.47; S, 9.12.

The acid was also obtained by alkaline hydrolysis of the corresponding ester followed by neutralization.

The hydrobromide of 3-(p-chlorophenyl)-2,3-dihydro-3-hydroxythiazole[3,2-a]benzimidazole-2-acetic acid was also prepared by heating a glacial acetic acid solution of 3-bromo-3-(p-chlorobenzoyl) propionic acid (11.64 g., 0.04 m.) and 2-mercaptobenzimidazole (6.00 g., 0.04 m.) on a steam bath for 3½ hours. The crude solid weighed 15 g.

EXAMPLE 4

3 - (p - chlorobenzoyl) - 3 - (benzimidazole-2-ylthio) propionic acid, methyl ester, hydrobromide 3 - bromo - 3 - (p-chlorobenzoyl)propionic acid (60.0 g.) dissolved in methanol was heated to reflux for two days. The solvent was removed, and the residue dissolved in benzene. The benzene solution was washed with sodium bicarbonate and then dried over anhydrous magnesium sulfate. After the benzene was removed, a heavy oil (64 g.) was obtained. The IR spectrum: ester 5.75μ; C=O 5.9μ. NMR: aromatic 8.0δ (m.); methine 5.6δ (two sets of doublets); OCH₃ 3.7δ (s.); methylene 3.3δ (two sets of quartets).

The methyl ester was also prepared by methylation of the corresponding acid with diazomethane.

A methanol solution of 3-bromo-3-(p-chlorobenzoyl) propionic acid, methyl ester (6.1 g., 0.02 m.) and 2-mercaptobenzimidazole (3.0 g., 0.02 m.) was heated to reflux for six hours. After filtration the solution was concentrated. The oily residue was treated with benzene and the solid was collected. The crude material was recrystallized from a mixture of methanol and acetone to give 4.5 g. of pure material, M.P. 182–5°.

*Analysis.*—Calcd. for $C_{18}H_{15}ClN_2O_3S \cdot HBr$ (percent): C, 47.42; H, 3.54; Br, 17.53; Cl, 7.78; N, 6.15; S, 7.03. Found (percent): C, 47.32; H, 3.64; Br, 17.72; Cl, 7.86; N, 6.25; S, 7.03. IR (KBr): amine HBr 3.6μ; ester 5.8μ; C=O 6.0μ. NMR: aromatic 7.6δ; methine 6.4δ: methylene and OCH₃ 3.7δ.

EXAMPLE 5

3-(benzimidazol-2 - ylthio) - 3 - benzoylpropionic acid, ethyl ester, hydrobromide The 3-benzoylpropionic acid was esterified in absolute ethanol in the presence of HCl. The ester was brominated in chloroform to give 3-bromo-3-benzoylpropionic acid, ethyl ester which is an oil. IR: C—H 3.4μ; ester 5.75μ; C=O 5.9μ. NMR: aromatic 7.6δ (m.); methine 5.5δ (two sets of doublets); methylene 3.25δ (two sets of quartets); ethoxy 4.1δ (q.) and 1.2δ (t.).

An ethanol solution of 3-bromo-3-benzoylpropionic acid, ethyl ester (14.25 g., 0.05 m) and 2-mercaptobenzimidazole (7.5 g., 0.05 m) was heated to reflux for six hours. After filtration the solution was concentrated. The residue upon treatment with 50 ml. acetone gave some solid which was collected. The crude material was recrystallized from acetone. The pure material weighed 14.5 g. and had a melting point of 126–7°.

*Analysis.*—Calcd. for $C_{19}H_{18}N_2O_3S \cdot HBr$ (percent): C, 52.42; H, 4.40; Br, 18.35; N, 6.44; S, 7.37. Found (percent): C, 52.46; H, 4.28; Br, 18.08; N, 6.39; S, 7.43. IR: 3.6μ amine HBr; ester 5.7μ; C=O 5.9μ. NMR: aromatic 7.5δ (m.); methine 5.9δ; methylene 3.2δ; ethoxy 4.0δ (q.) and 1.1δ (t.).

EXAMPLE 6

2,3-dihydro-3-hydroxy-3-phenylthiazolo[3,2-a] benzimidazole-2-acetic acid, ethyl ester A benzene-water mixture of 3-(benzimidazol-2-yl-thio)-3-benzoylpropionic acid, ethyl ester, hydrobromide, (9.0 g.) was stirred and neutralized with a dilute NaHCO₃ solution. The layers were separated. The organic layer was dried over anhydrous magnesium sulfate. After benzene was removed, the residue was treated with acetone and the solid (7.0 g.) was collected. The crude material was recrystallized from acetone to give pure compound, M.P. 129–31°.

*Analysis.*—Calcd. for $C_{19}H_{18}N_2O_3S$ (percent): C, 64.39; H, 5.12; N, 7.91; S, 9.05. Found (percent): C, 64.31; H, 5.18; N, 7.63; S, 9.08. IR: OH 3.2μ; ester 5.75μ. NMR: aromatic 7.4δ (m.); methine 5.6δ; methylene 3.2δ; ethoxy 4.1δ (q.) and 1.2δ (t.).

EXAMPLE 7

2,3 - dihydro-3-hydroxy - 3 - phenylthiazolo[3,2-a]benzimidazole-2-acetic acid, methyl ester, hydrobromide 3-benzoylpropionic acid (100 g.) was esterified with methyl alcohol which was saturated down HCl. After the solution was heated to reflux overnight, the solvent was removed. The residue was dissolved in benzene, and the benzene solution was washed with a dilute NaHCO₃ solution and dried over anhydrous MgSO₄. After removal of benzene there was obtained 95 g. of 3-benzoylpropionic acid, methyl ester. IR: ester, 5.75μ; keto, 9.0μ.

The above keto ester was brominated in a chloroform solution was 79 g. of bromine. The 3-bromine-3-benzoylpropionic acid, methyl ester (134 g.) was an oil. IR: ester, 5.75μ; keto 9.0μ. NMR (CDCl₃) aromatic. 7.7δ (m.); methine, 5.5δ (two sets of doublets); acetylmethyl, 3.6δ (two sets of quartets); CH₃O, 3.7δ (s.).

(A) A glacial acetic acid solution of 2-mercaptobenzimidazole (2.5 g., 0.0166 m) and 3-bromo-3-benzoylpropionic acid, methyl ester (4.5 g., 0.02 m) was heated on a steam bath for one hour. After the solvent was removed, the residue was first washed with anhydrous ether and then dissolved with a small amount of acetone. The crude solid material (3.1 g.) which separated out from acetone was collected and recrystallized from the same solvent to give pure compound, M.P. 145–7°.

*Analysis.*—Calcd. for $C_{18}H_{16}N_2O_3S \cdot HBr$ (percent): C, 51.31; H, 4.07; Br, 18.97; N, 6.65; S, 7.61. Found (percent): C, 51.60; H, 4.28; Br, 19.05; N, 6.69; S, 7.84. IR: OH, 3.25μ; amine HBr, 4.0μ; ester, 5.85μ. NMR (DMSO): aromatic, 7.5δ (m.); methine, 5.9δ (t.); methylene, 3.3δ (two singlets); OCH₃, 3.6δ (s.); exchangeable, 12.1δ.

(B) 2,3 - dihydro-3-hydroxy - 3 - phenylthiazolo[3,2-a] benzimidazole-2-acetic acid, methyl ester, hydrobromide was also prepared by heating to reflux a methanol solution of 3-bromo-3-benzoylpropionic acid, methyl ester (10.8 g., 0.04 m) and 2-mercaptobenzimidazole (6.0 g., 0.04 m) for five hours. The crude material (13.5 g.), after removal of solvent, was recrystallized from acetonitrile .

EXAMPLE 8

3-[5-(6-aminobenzimidazol-2-ylthio]-3-(p-chlorobenzoyl) propionic acid, ethyl ester, hydrobromide An ethanol solution of 3-bromo-3-(p-chlorobenzoyl) propionic acid, ethyl ester (12.8 g., 0.04 m) and 5-amino-2-benzimidazolethiol (6.6 g., 0.04 m) was heated to reflux for 3½ hours. After the solution was treated with Darco, the solvent was removed. The oily residue was treated with benzene to give 16 g. of crude material. The crude material was recrystallized from a mixture of C₂H₅OH and acetone, dec. at 250°.

*Analysis.*—Calcd. for $C_{19}H_{18}ClN_3O_3S \cdot HBr$ (percent): C, 47.18; H, 3.75; Br, 16.52; Cl, 7.33; N, 8.69; S, 6.63. Found (percent): C, 46.83; H, 3.90; Br, 16.00; Cl, 7.10; N, 8.63; S, 7.02. IR: amine HBr, 3.5μ; ester, 5.7μ; ketone, 5.85μ. NMR (DMSO): aromatic 7.68δ (m.); methine, 5.9δ; methylene, 3.3δ; ethoxy, 4.1δ (q.) and 1.1δ (t.), also exchangeable at 10.0δ.

EXAMPLE 9

3-(p-chlorophenyl-2,3-dihydro-3-hydroxythiazolo-[3,2-a]benzimidazole-2-acetic acid, methyl ester A suspension of 3-(p-chlorobenzoyl)-3-(benzimidazol-2-ylthio)propionic acid, methyl ester, hydrobromide (12.0 g.) in a mixture of chloroform and water was stirred and neutralized with a dilute solution of NaHCO₃. The layers were separated. The chloroform layer was washed once with water and dried over anhydrous MgSO₄. After removal of the solvent, the oily residue was dissolved in acetone. From the acetone solution 8.2 g. of the product (M.P. 132–4°) was obtained.

*Analysis.*—Calcd. for $C_{18}H_{15}ClN_2O_3S$ (percent): C, 57.68; H, 4.03; Cl, 9.46; N, 7.48; S, 8.56. Found (percent): C, 57.20; H, 3.98; Cl, 9.27; N, 7.32; S, 8.73. IR: OH, 3.3μ; ester, 5.75μ. NMR (DMSO); aromatic, 7.5δ (m.); methine, 5.8δ; OCH₃, 3.6δ (s.); methylene, 3.3δ.

EXAMPLE 10

3-(p-chlorobenzoyl)-3-[5(6)-nitrobenzimidazol-2-ylthio]propionic acid, ethyl ester, hydrobromide A glacial acetic acid solution of 3-bromo-3-(p-chlorobenzoyl)propionic acid, ethyl ester (12.7 g., 0.04 m) and 5-nitro-2-benzimidazolethiol (7.8 g., 0.04 m) was heated on a steam bath for 15 hours. The yellow solid was collected. The mother liquor upon concentration gave more solid. The crude material was recrystallized from ethanol. The pure product weighed 13 g. and melted at 218–20°.

*Analysis.*—Calcd. for $C_{19}H_{16}ClN_3O_5S \cdot HBr$ (percent): C, 44.32; H, 3.33; Br, 15.52; Cl, 6.89; N, 8.16; S, 6.23. Found (percent): C, 44.38; H, 3.32; Br, 15.18; Cl, 6.74; N, 7.81; S, 5.98. The IR spectrum showed absorptions for ester at 5.8µ, keto group at 6.0µ; $NO_2$ group at 6.7 and 7.5µ. The NMR spectrum (DMSO-$d_6$) showed aromatic protons at 8.1δ (m.), a methine proton at 6.1δ (t.), two methylene protons at 4.2δ (q.), two methylene protons at 3.3δ, there methyl protons at 1.2δ a triplet exchangeable proton at 9.8δ.

EXAMPLE 11

3-(p-chlorophenyl) - 2,3 - dihydro-3-hydroxy-7-(or 6)-nitrothiazolo[3,2-a]benzimidazole-2-acetic acid, ethyl ester, hydrobromide A mixture of 3-(p-chlorobenzoyl-3-[5-(or 6)-nitrobenzimidazol-2-ylthio]-propionic acid, ethyl ester hydrobromide (9.0 g.) in chloroform and a dilute sodium bicarbonate solution was stirred at room temperature for two hours. A small amount of solid was filtered off. The layers were separated. The chloroform layer was washed with water and dried over anhydrous magnesium sulfate. After chloroform was removed, the residue was treated with benzene and the solid was collected. The crude material weighing 7.2 g. was recrystallized from benzene and the pure compound melted at 99–101°.

*Analysis.*—Calcd. for $C_{19}H_{16}ClN_3O_5S$ (percent): C, 52.59; H, 3.72; Cl, 8.17; N, 9.69; S, 7.39. Found (percent): C, 52.51; H, 3.66; Cl, 8.64; N, 9.74; S, 7.36. The IR spectrum showed absorption for ester 5.75µ, nitro group at 6.55 and 7.5µ.

EXAMPLE 12

The methods analogous to those employed above the following compounds are prepared:

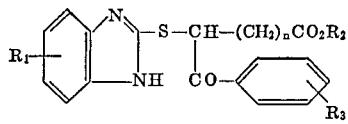

wherein $R_1$, $R_2$, $R_3$ and $n$ are defined below:

| $R_1$ | $R_2$ | $R_3$ | $n$ |
|---|---|---|---|
| 5 (6) amino | Ethyl | 4-methyl | 2 |
| 4 (7) methyl | n-Propyl | 4-bromo | 1 |
| 5 (6) chloro | Hydrogen | 4-trifluoromethyl | 3 |
| 5(6) bromo | Methyl | 3-amino | 2 |
| 4 (7) iodo | Hydrogen | Hydrogen | 2 |
| 5 (6) fluoro | Ethyl | 4-bromo | 3 |
| 5 (6) ethyl | Hydrogen | 3-amino | 2 |
| 5 (6) n-propyl | Methyl | 4-nitro | 1 |
| 4 (7) methyl | do | Phenyl | 1 |
| 4 (7) chloro | Ethyl | p-Tolyl | 2 |
| 5 (6) hydrogen | Methyl | p-Chlorophenyl | 1 |
| 5 (6) trifluoromethyl | Ethyl | 4-fluoro | 3 |
| 5 (6) hydrogen | Hydrogen | 4-ethyl | 3 |
| Do | Methyl | 3-n-propyl | 2 |
| Do | Hydrogen | m-Bromophenyl | 2 |

EXAMPLE 13

By methods analogous to those employed above the following compounds are prepared:

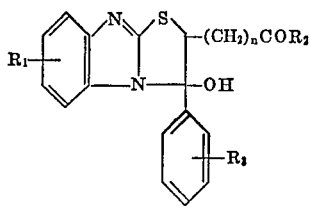

wherein $R_1$, $R_2$, $R_3$ and $n$ are defined below:

| $R_1$ | $R_2$ | $R_3$ | $n$ |
|---|---|---|---|
| 6 or 7 amino | Ethyl | 4-methyl | 2 |
| 5 or 8 methyl | n-Propyl | 4-bromo | 1 |
| 6 or 7 chloro | Hydrogen | 4-trifluoromethyl | 3 |
| 6 or 7 bromo | Methyl | 3-amino | 2 |
| 5 or 8 iodo | Hydrogen | Hydrogen | 2 |
| 6 or 7 fluoro | Ethyl | 4-bromo | 3 |
| 6 or 7 chloro | Methyl | Phenyl | 1 |
| Do | Ethyl | p-Tolyl | 2 |
| 6 or 7 ethyl | Hydrogen | 3-amino | 2 |
| 6 or 7 n-propyl | Methyl | 4-nitro | 1 |
| 6 or 7 trifluoromethyl | Ethyl | 4-fluoro | 3 |
| 6 or 7 hydrogen | Hydrogen | 4-ethyl | 3 |
| Do | Methyl | 3-n-propyl | 2 |
| Do | do | p-Chlorophenyl | 1 |
| Do | Hydrogen | m-Bromophenyl | 2 |

As used herein the term (lower)alkyl is used to describe hydrocarbon radicals containing from one to about six carbon atoms such as methyl, ethyl, i-propyl, n-propyl and the like. The terms halo and halogen are used to identify chloro, iodo and bromo.

The term pharmaceutically acceptable acid addition salts is used to include those non-toxic acid addition salts such as are formed by reaction with acids such as hydrochloric, hydrobromic, sulfuric, phosphoric, nitric and the like.

We claim:
1. A compound of the formula:

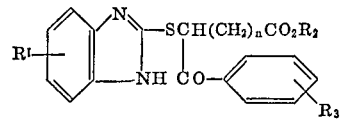

wherein $R_1$ is selected from the group consisting of hydrogen, halogen, (lower)alkyl, trifluoromethyl, nitro and amino; $R_2$ is selected from the group consisting of hydrogen and lower alkyl; $R_3$ is selected from the group consisting of hydrogen, halogen, (lower alkyl, trifluoromethyl, nitro, amino, phenyl, halophenyl and (lower) alkylphenyl; $n$ is an interger of from 1 to 3; and the pharmaceutically acceptable acid addition salts thereof.

2. A compound as defined in claim 1 which is 3-(benzimidabol-2-ylthio)-3 - (p-chlorobenzoyl)propionic acid, ethyl ester, hydrobromide.

3. A compound as defined in claim 1 which is 3-(p-chlorobenzoyl)-3-(benzimidazole-2-ylthio)propionic acid, methyl ester, hydrobromide.

4. A compound as defined in claim 1 which is 3-(benzimidazol-2-ylthio)-3-benzoylpropionic acid, ethyl ester hydrobromide.

5. A compound as defined in claim 1 which is 3-[5(6)-aminobenzimidazol-2 - ylthio]-3-(p - chlorobenzoyl)propionic acid, etheyl ester, hydrobromide.

6. A compound as defined in claim 1 which is 3-(p-chlorobenzoyl)-3-[5(6) - nitrobenzimidazol - 2-ylthio]-propionic acid, ethyl ester, hydrobromide.

References Cited

UNITED STATES PATENTS 3,558,775   1/1971   Fournier _____ 260—309.2

OTHER REFERENCES

C.A. 51:9814i (1957) Rebstock et al.

HENRY R. JILES, Primary Examiner

S. D. WINTERS, Assistant Examiner